United States Patent
Newman

(10) Patent No.: US 10,649,980 B2
(45) Date of Patent: May 12, 2020

(54) METHODS AND SYSTEMS FOR RESILIENT, DURABLE, SCALABLE, AND CONSISTENT DISTRIBUTED TIMELINE DATA STORE

(71) Applicant: XANADU BIG DATA, LLC, Lexington, MA (US)

(72) Inventor: Rhys Andrew Newman, Perth (AU)

(73) Assignee: Xanadu Big Data, LLC, Lexington, MA (US)

( * ) Notice: Subject to any disclaimer, the term of this patent is extended or adjusted under 35 U.S.C. 154(b) by 0 days.

(21) Appl. No.: 15/914,119

(22) Filed: Mar. 7, 2018

(65) Prior Publication Data
US 2019/0278854 A1    Sep. 12, 2019

(51) Int. Cl.
| G06F 16/23 | (2019.01) |
| G06F 16/22 | (2019.01) |
| G06F 16/215 | (2019.01) |
| G06F 16/2458 | (2019.01) |

(52) U.S. Cl.
CPC ........ *G06F 16/2365* (2019.01); *G06F 16/215* (2019.01); *G06F 16/22* (2019.01); *G06F 16/2477* (2019.01)

(58) Field of Classification Search
CPC ......... G06F 17/30371; G06F 17/30303; G06F 17/30312; G06F 17/30551; G06F 16/2365; G06F 16/22; G06F 16/215; G06F 16/2477
USPC ........................................................ 707/692
See application file for complete search history.

(56) References Cited

U.S. PATENT DOCUMENTS

| 8,122,012 | B2 | 2/2012 | Dettinger et al. |
| 2006/0047895 | A1* | 3/2006 | Rowan ................ G06F 11/0727 711/112 |
| 2010/0106734 | A1* | 4/2010 | Calder ................. G06F 16/215 707/758 |
| 2013/0198642 | A1* | 8/2013 | Carney ................ G06F 3/0484 715/738 |
| 2014/0006458 | A1 | 1/2014 | Hsieh et al. |
| 2014/0025837 | A1* | 1/2014 | Swenson ........... H04L 29/06027 709/231 |

(Continued)

OTHER PUBLICATIONS

International Search Report and Written Opinion issued in PCT/IB19/51816 dated Jul. 3, 2019.

*Primary Examiner* — Hosain T Alam
*Assistant Examiner* — Saba Ahmed
(74) *Attorney, Agent, or Firm* — Womble Bond Dickinson (US) LLP; John J. Penny, Jr.

(57) ABSTRACT

The present disclosure discloses methods and systems for managing data in a database in accordance with a data model, henceforth referred to as a "timeline store" or "timeline model". The method includes mapping each data reference of one or more data references with a data value of a block of data in a data store. Then, each key reference of one or more key references is mapped with at least one pair of a time reference and the data reference in a timeline store, the time reference determines a point in time at which the key reference is assigned the pair of the time reference and the data reference. Thereafter, the data model is queried to retrieve a set of key references mapped to data references based on a specific ranges of keys and time or time intervals. Finally, the data model is queried to retrieve the raw data bytes associated/mapped with/to any desired data reference.

15 Claims, 4 Drawing Sheets

Exemplary System

(56) References Cited

U.S. PATENT DOCUMENTS

| | | | |
|---|---|---|---|
| 2014/0143213 A1* | 5/2014 | Tal | G06F 16/2365 |
| | | | 707/692 |
| 2014/0304275 A1* | 10/2014 | Baskett | G06F 16/221 |
| | | | 707/747 |
| 2015/0142753 A1* | 5/2015 | Soon-Shiong | G06F 16/2272 |
| | | | 707/673 |
| 2015/0172412 A1* | 6/2015 | Escriva | G06F 9/466 |
| | | | 709/202 |
| 2015/0261563 A1 | 9/2015 | Guerin et al. | |
| 2016/0337470 A1 | 11/2016 | Hwang et al. | |
| 2017/0214675 A1* | 7/2017 | Johnsrud | H04L 63/08 |
| 2017/0249349 A1* | 8/2017 | Bhat | G06F 16/2365 |

* cited by examiner

Exemplary Tables

| String | Time | Data Reference |
|--------|----------|------------|
| Key1 | 28742834 | ABF878329 |
| Key2 | 28742801 | ABF878329 |
| Key1 | 28742800 | 992BAF879 |

String Table

| Data Reference | Data Bytes |
|----------------|------------|
| ABF878329 | 9384294795739535793584395837539583538382 |
| 992BAF879 | 937859435730001 |

Data Table

FIG. 3

METHODS AND SYSTEMS FOR RESILIENT, DURABLE, SCALABLE, AND CONSISTENT DISTRIBUTED TIMELINE DATA STORE

FIELD

The present disclosure generally relates to the field of databases, and in particular, the present disclosure relates to methods and systems for managing data in a database in accordance with a data model to implement a resilient, durable, scalable, consistent distributed timeline data store.

BACKGROUND

Traditionally, relational databases offer a reliable way of storing and retrieving large amounts of data, and are a common type of database. Previously, companies used to install database software on physical computers with large attached storage in the form of hard disks, and other permanent storage media, in conjunction with faster "Random Access Memory" (RAM). In recent years, the volume of data has grown exponentially and companies have realized that this approach is incapable of handing these volumes of data. Now more than ever data is extremely important for businesse sand individuals alike. Accurate and reliable data is crucial to support business decisions so it is imperative to store and query it reliably and quickly. Currently, the manner in which data is stored on server is somewhat inefficient due to speed and access requirements. To this end, to minimize or overcome such challenges, one solution is to scale horizontally using many smaller servers (e.g., nodes) that still simulates a single "centralised" storage service that is familiar to user and developers alike. When data is highly distributed, however, it is difficult to handle system-wide (i.e. global) atomic update to data, especially because nodes may fail randomly (e.g., temporarily or permanently). The network may also fail to deliver key edit instructions to all nodes as required so naive systems that assume reliable messaging will fail in random and untraceable ways. By comparison, single machine databases (i.e., non-distributed) offer features (reliability and consistency) that are difficult to achieve in a large and distributed system of computing "nodes". The properties of ACID (atomicity, consistency, independence and durability) have become the cornerstone of most enterprise applications and are core features of most traditional relational database engines (e.g., MySQL, Oracle).

To address the above noted drawbacks of databases and storage, the concept of NoSQL (or non-SQL) databases has emerged to describe distributed databases that offer scalability as the expense of some other benefits of traditional relational database management systems (RDBMS). Often these NoSQL systems did not provide"atomic" updates, or supported only a limited data model compared to a traditional relational database. The simplest type is a distributed Key→Value store, where a fixed data "key" could be used to store and then retrieve a value (often just an arbitrary array of bytes).

Some highly distributed systems have since managed to provide ACID properties on top of simple key-value data models. Despite these advancements, achieving a fully ACID level of guarantee over a widely distributed database system is challenging and often the speed of the system is fundamentally limited by the need to maintain the illusion of a globally consistent data model.

In parallel to these above-mentioned developments business systems have, for a variety of regulatory, security and audit reasons increasingly had to support time-stamping of updates. Such systems maintain snapshots of states in a way that the full state of the database at points in the past can be recovered even if some data is later edited and/or deleted. The benefits of this for audit purposes is clear, given that regulations create an increasingly important need for a strongly auditable system.

The time-granularity of systems varies from periodic full dumps (such as a traditional backup) to fully time-transactional systems that record every separate edit and can therefore view a database to any time in the past. Within the stable of conventional RDBMS systems, SQL server introduced the idea of temporal tables, and Oracle provides some support with their "flashback" technology. An optimal time-transactional system is one which records every edit, has unlimited storage, scale and high-performance data querying abilities on a relational data model. In view of all the above, there is a need for efficient methods and systems to overcome the above-mentioned challenges, by providing a system and methods that enable the recording of edits, provide unlimited (or substantially unlimited) storage, is scalable and delivers high performance.

SUMMARY

An embodiment of the present disclosure provides a method for managing data in a database in accordance with a data model. The method includes mapping each data reference of one or more data references with a data value of a block of data in a data store. Then, each key reference of one or more key references is mapped with at least one pair of a time reference and the data reference in a timeline store, the time reference determines a point in time at which the key reference is assigned the pair of the time reference and the data reference. Thereafter, the data model is queried to retrieve a set of key references mapped to data references based on a specific range of time. The data model is queried to retrieve a set of data references based on a specific range of time.

Another embodiment of the present disclosure provides a database management system for managing data in accordance with a data model. The database management system includes a timeline store, data store and a query processor. The timeline store is configured to store one or more key references, each key reference of the one or more key references is mapped to at least one pair of a time reference and a data reference, wherein the time reference determines a point in time at which the key reference is assigned the pair of the time reference and the data reference. The data store is configured to store one or more data references, wherein each data reference is mapped to a data value. The query processor is configured to: query the data model to retrieve a set of key references mapped to data references based on a specific range of time; and query the data model to retrieve a set of data references based on a specific range of time.

BRIEF DESCRIPTION OF DRAWINGS

This disclosure will be more fully understood from the following detailed description taken in conjunction with the accompanying drawings, in which:

FIG. 3 shows exemplary arrays depicting key references, data references and time references, according to an example embodiment of the present disclosure.

DETAILED DESCRIPTION

Figure 1:
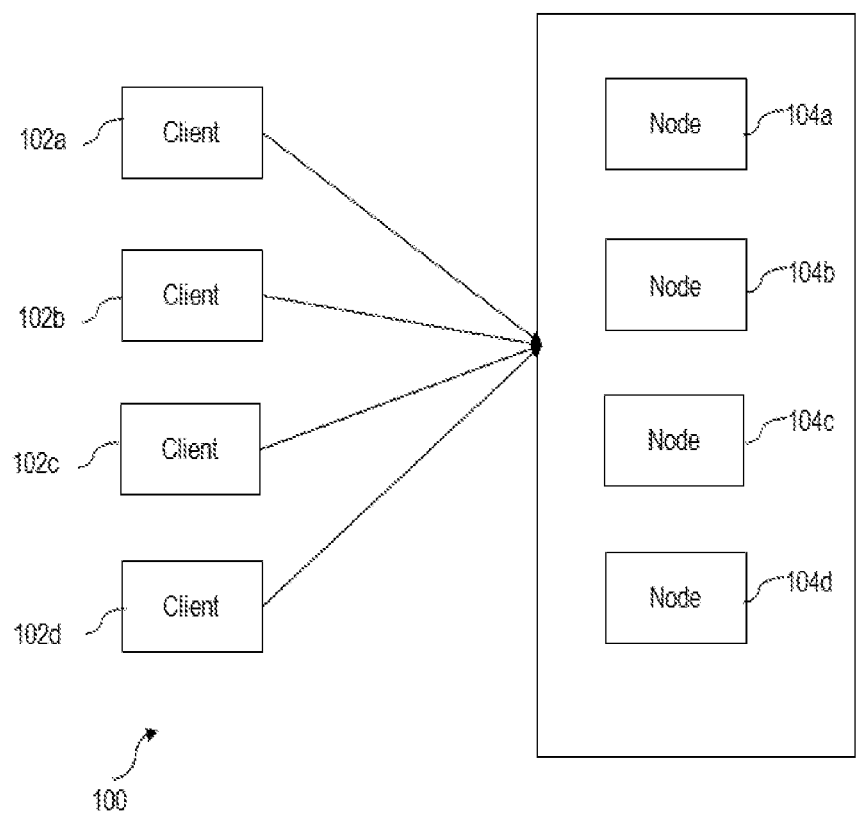
FIG. 1 illustrates an exemplary environment in which various embodiments of the present disclosure can be practiced.

The present disclosure will now be described more fully with reference to the accompanying drawings, in which embodiments of the present disclosure are shown. However, this disclosure should not be construed as limited to the embodiments set forth herein. Rather, these embodiments are provided so that this disclosure will be thorough and complete, and will fully convey the scope of the present disclosure to those skilled in the art. In the present disclosure, like-numbered components of various embodiments generally have similar features when those components are of a similar nature and/or serve a similar purpose.

The present disclosure discloses methods and systems for managing data in a database in accordance with a data model. The disclosed data model is a temporal data model that is distributed, horizontally scalable, resilient, consistent and durable. In particular, the methods and systems described herein focus on the use of a unique temporal data model that extends the basic key→value concept. The data model maps strings (e.g., text or data) to historical data timelines, or presents equally a time-ordered list of pairs (e.g., data reference, time pairs). This list is referred to as "Timeline". Based on the (data reference, time) pairs, it is possible to quickly extract these pairs based on the nearest time to a target time (e.g., closest time on the historical data timeline). Moreover, it is possible to provide simple scanning of the time ordered history for a given data entry of the top-level data model. The data model is a way to list all of the timeline values within a (string-range, time-range) region of the data as if positioned on a 2-D plane with time and ordered strings along each axis (i.e., "time" axis and "key" axis, respectively).

The present disclosure is implemented in the context of a distributed database (also referred to herein as a "big data database") that implements a full-featured NoSQL query language. The database can use state of the art distributed and fault-tolerant agreement algorithms known to those of skill in the art, and therefore can execute distributed transactions with Atomicity, Consistency, Isolation, and Durability (ACID) semantics.

In comparison to existing RDBMS/NoSQL systems, the present disclosure implements a (key→timeline) map with highly efficient mechanisms for a query that also provides the important properties of durability, resiliency, consistency and scalability. Overall, the present disclosure provides a fully temporal (i.e., recording all data values and updates thereto) database in NoSQL space and represents a powerful tool to address increasingly important requirements faced in the enterprise to store data as updated in a way that records the full and complete history over time. In addition, the present disclosure offers horizontal scalability for virtually unlimited storage capacity. For easy understanding of the present disclosure, a few terms that are used in the description are defined or discussed without limiting the scope of the terms. The term "database" refers to any repository for storing data in a desired format. For example, the database can be a "distributed" database. The term "data model" represents a schema to represent or store data in the database. In the context of the present disclosure, the data model is a temporal data model, where time value is stored with all data values. The data is stored in a distributed database system that can be retrieved by using a digital address defined in the context of a distributed addressing algorithm/system; this address is referred to as the "data reference." The data model may also be interchangeably used with the term "data map." The term "data" represents any information related to one or more users. The data may interchangeably be used with the phrase "value", "block of data", or "data value". The data can be a value, such as an integer, string, a JSON structure, or an array. The term "key reference" or simply "key" represents a specific handle with which to refer to any data or data value (via a data reference). The term may interchangeably be used with the phrase "reference key". The "timeline store" stores (e.g., data reference→time) pairs in a highly space-efficient format. The timeline store may be referred to as a string table. The "data store" stores data in any required format. The data store may be referred to as a "data table" by analogy to standard database nomenclature. Keys are used to reference or "point to" a data reference which in turn enables the distributed system to unambiguously retrieve the correct data value using the predefined addressing system/algorithm. Storage media that can be used for the data store and timeline store includes volatile and nonvolatile, removable and non-removable media implemented in any method or technology for storage of information. Storage media can include memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid state devices (e.g., solid state drive (SSD), flash memory drive (e.g., card, stick, key drive)), or any other like medium which can be used to store the desired information.

FIG. 1 is an exemplary environment 100 in which various embodiments of the disclosure can be practiced. The environment 100 represents a distributed system, e.g., a distributed database management system, where data is stored over multiple locations (e.g., different countries, different regions, different states, etc.). The data may also be present at one physical location but on multiple computers. Further, the distributed database management system 100 may include network attached storage (NAS), storage area networks (SANs), and cloud-based storage (e.g., Internet area network (IAN) storage systems). The distributed database management system 100 is developed to provide storage of large amounts of electronic data. Such system 100 is configured to store electronic data of one or more users/devices and to access the stored electronic data by the one or more users/devices.

As shown, the distributed database management system 100 includes one or more clients such as 102a, 102b, 102c, and 102d (collectively 102, also be referred to as client devices) and one or more nodes such as 104a, 104b, 104c, and 104d (collectively 104, also referred to as server nodes). The clients 102 are communicatively coupled to the nodes 104 via a network. The network may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof. The network may be any other type of network that is capable of transmitting or receiving data to/from host computers, storage devices, personal devices, telephones, video/image capturing devices, video/image servers, or any other electronic devices. Further, the network is capable of transmitting/sending data between the mentioned devices. Additionally, the network may be a local, regional, or global communication network, for example, an enterprise telecommunication network, the Internet, a global mobile communication network, or any combination of similar networks. The network may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network may include any software, hardware, or computer applications that can provide a medium to exchange signals or data in any of the formats known in the art, related art, or developed later.

The clients 102 may be located remotely from the nodes 104. While in other examples, the clients 102 may be located locally. The clients 102 may perform a number of transactions or operations such as create, insert, read (query or access), update, delete and the like, as known to those skilled in the art. For example, the clients 102 may access data stored over the nodes 104. In other examples, the clients 102 may write and read data to and from the nodes 104. Further, the clients 102 may be used by one or more users for data retrieval. While, the clients 102 may be used by one or more "Administrator" users for storage of data, creation of one or more data entries, or the like. Various examples of the clients 102 include, but not limited to, such as cell phones, personal digital assistants (PDAs), computers, servers, laptop computers, tablets, Internet appliances, or mainframe computers.

The nodes 104 may be embedded in a computing device. In other examples, the nodes 104 may represent an external hard-disk drive, a USB flash drive, a memory card, a compact disk, a server, a Digital Versatile Desk, etc. The nodes 104 store data in various forms, such as raw data, processed data, developed content, and/or the like. In an example, all the nodes 104 may be present at a single location, while in other example, the nodes 104 may be distributed geographically. The nodes 104 are represented in a way to behave as a single node 104a, for example or server from the point of view of the clients 102. The number of nodes 104 shown is exemplary in nature, more nodes can be added to the network as and when required to increase throughput and capacity. Each node 104 as shown may have similar structural and functional details but may also differ from one another.

The nodes 104 store data in a desired format and the data relates to one or more users. Each node 104 is identified by a unique identifier (ID). The nodes 104 may be storage devices or set of closely-linked database servers or block chain servers. Each node 104 is controlled by one person or organization. A number of transactions can be performed on the node 104 such as insert, update, and delete operations on data stored over the nodes 104. The data is stored on the nodes 104 in accordance with a data model.

In context of the present disclosure, the nodes 104 store data in accordance with a temporal key-value data model, referred to in the following as a "Timeline Store". The data mode is stored in (key, data reference, time) tuples. According to the proposed data model of the present disclosure, data is stored in two simple data stores that act together to achieve the storage of these tuples—these two are referred to as the "timeline store" and "data store". In detail, the database management system 100 has 2 layers, i.e., includes 2 stores i.e., a timeline store and a data store that splits the work between these 2 stores with a simple fixed bit-length "Reference" number as the central "join" key between these 2 stores. The data store stores data and advertises fixed bit-length references to the clients 102 (the reference is like a tracking receipt for the data). The timeline store includes a time-ordered list of data entries i.e., (data reference, time) pairs that map "keys" to data (via its reference or address) at a specific time. The small fixed length of the data references in the timeline store mean entries can be read and written at extremely high speed. The timeline store may be loaded in main memory (RAM) of the nodes 104 for fastest possible response time.

The (key, data reference, time) tuple is unique as proposed by the present disclosure as the system maintains time stream of all edits (can also be referred to as data history). The data is arranged where keys are along one axis of a 2-dimensional space (i.e., along Y axis where the string is represented as a real number between 0 and 1) and time along the other axis (i.e., X axis). The client 102 sends a query to stream all the data edits contained within a two dimensional box in this plane. The data model allows arbitrary ranges of keys and times to be specified in such queries. In the present disclosure the system is constructed to ensure it is possible to perform consistent multi-key transactional updates, and further to perform range (in time and key space) based "Compare and Set" operations—e.g., a concurrent update to a number of keys e.g., (at a specific time—implicitly the transaction time) conditioned on there being no edits within a specified (key, time) range.

The actual mapping is to regard the data (key) as raw bits and then consider it a long binary representation of the fractional part of 1. For example, "hello" can be modelled as a 5 digit number in base 26 (the number of letters in the alphabet), and with a decimal point placed at the front of this representation so that all character strings become one-to-one mapped to the real number line between 0 and 1 ("hello"=(26^4*8+26^3*5+26^2*12+26*12+15)/(26^5)= 0.8029422 in the conventional base 10 decimal representation). Consequently all string "keys" can be ordered within this [0,1] range and tested for membership of any interval (expressed as minimum and maximum value on [0,1]). Combined with a desired time range (expressed as real time in nanoseconds for example) this allows conventional set operations, such as "intersects", to be meaningful for a space generated by the Cartesian product of "strings" and time.

When a key is updated, a new entry is appended to the timeline store with a reference to the new data. The actual data is stored separately in the value store, which uses deduplication to preferentially return references for inclusion in the timeline store that refer to data that has been stored previously (in a scalable and distributed manner). This means that multiple copies of data are not stored unnecessarily. The key update is handled with a distributed and fault-tolerant agreement algorithm. The distributed and fault-tolerant agreement algorithm can include the industry best practice RAFT and PAXOS algorithms. The distributed and fault-tolerant agreement algorithm provides a distributed ACID guarantee for all keys using the PAXOS algorithm. The distributed agreement of key updates is very fast due to the small amount of data that needs to be agreed (e.g., only the new small fixed bit-length data reference value for a key). If a client such as 102a fails part way through a store operation to the data store (e.g., in preparation to updating a key), it can be tried again without any inconsistency issues.

The entire history of the string space (including at all times) can in all practical applications be held in memory (nodes with many GB of RAM can hold billions of updates and their histories) and thus complex queries over key ranges and time periods can be handled very quickly. The present disclosure allows atomic updates on multiple keys (e.g., transactions) by using the PAXOS algorithm.

The present disclosure discloses a distributed database management system where data is stored over multiple data storage nodes in such a way that, along with data, time value is also stored each time when a key is mapped to data or value. The new proposed data model stores data in two tables: one where data is stored and second where key/time values are stored, thereby recording key values at specific times.

Figure 2:
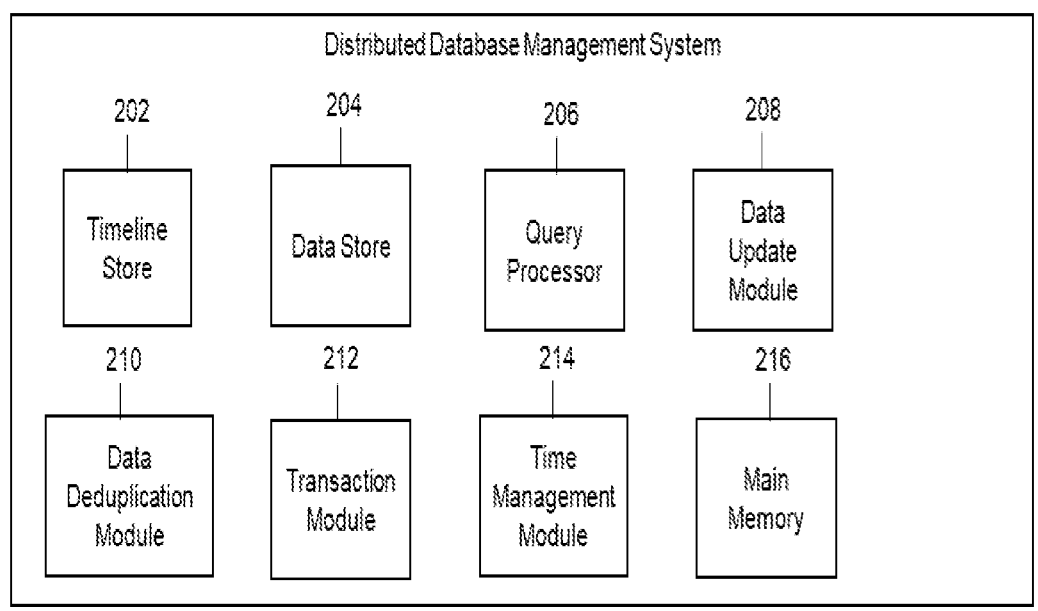
FIG. 2 shows an exemplary system for managing data in a database in accordance with a data model, according to an example embodiment of the present disclosure.

FIG. 2 shows an exemplary system 200—e.g., a database management system for managing data in a database in accordance with a data model. The database management system 200 includes a timeline store 202, a data store 204, a query processor 206, a data update module 208, data deduplication module 210, a transaction processing module 212, time management module 214, and a main memory 216. Each of the components 202-214 may be implemented in a single computing device or multiple computing devices connected to each other via a communication bus using known or later developed technology.

If a user wishes to store a block of data in the distributed system 200, the data block is assigned (by the system) with one or more data references that the system can use for identifying where the data is stored. One or more keys (e.g., identifying strings—most commonly human readable) corresponding to the data are identified. For a person skilled in the art, it understood the basic implementation or basic details before storing the data in accordance with the data model is known and thus no further details are needed.

As shown, the timeline store 202 is a consistent distributed timeline store and is configured to store one or more key references, wherein each key reference of the one or more key references is mapped to at least one pair of a time reference and data reference. As an example, consider key single reference mapped to a single time reference and data reference. When edits to this assignment/mapping are performed, a key reference is (re)mapped to subsequent time reference and data reference pair, thus forming a timeline with multiple entries. The time reference determines a point in time at which the key reference is assigned the pair of the time reference and the data reference.

The data store 204 is configured to store one or more data references, wherein each data reference is mapped to a data value (typically a raw array of bytes).

The query processor 206 is configured to receive a query from the client 102 (expressed for example in pseudo-sql: "select keys, values from DB where time between T1 and T2 and keys between 'A' and 'AB'"). The query may include a specific range of time, a specific range of keys, or a combination thereof. Based on the query received from the client 102, the query processor 206 is configured to: query the data model to retrieve a set of key references mapped to data references based on specific ranges of times and keys (either one or both of which may be missing in which case all times and/or all keys are implied). The query processor 206 is configured to query the data model to retrieve a set of data references based on a specific range of time. In addition, the query processor 206 is configured to query the data model to retrieve a set of key references mapped to data references based on a specific range of keys. In addition, the query processor 206 is configured to query the data model to retrieve a set of data references based on a specific range of keys. Further, the query processor 206 is configured to query the data model to retrieve a set of key references mapped to data references based on a specific combined range of time and keys. In addition, the query processor 206 is configured to query the data model to retrieve a set of data references based on a specific combined range of time and keys. The query processes may be realized in one or more microprocessors, microcontrollers, embedded microcontrollers, state machine, programmable digital signal processors or other programmable device. The processes be embodied in a general purpose processor, a digital signal processor (DSP), an application specific integrated circuit, a programmable gate array, programmable array logic, or any other device or combination of devices that may be configured to process electronic signals.

The data update module 208 is configured to map the key reference in the timeline store to a new pair of a time and data reference when the key reference is updated. The hardware for the data update module 208 may include a general-purpose computer and/or dedicated computing device.

The data deduplication module 210 is configured to deduplicate data in the data store 204. The data is deduplicated based on exact match of the data or block of data. The data store is therefore a lossless store with no approximations being applied when checking for duplicates. The hardware for the data duplication module 210 may include a general-purpose computer and/or dedicated computing device.

The transaction processing module 212 is configured to implement a distributed set of consensus processing groups, each of the consensus processing groups runs on one or more nodes. The hardware transaction processing module 212 may include a general-purpose computer and/or dedicated computing device.

The time management module is 214 is configured to use a hybrid time for event time resolution, wherein the hybrid time is based on system clock time and an additional data set. The hardware for the time management module 214 may include a general-purpose computer and/or dedicated computing device.

The main memory 216 such as RAM is configured to store the timeline store 202 for fast processing and responding. In place of the main memory 216, the present disclosure may also support solid state drives (SSDs) or rotating disks for storing the timeline store 202. It may be understood that in an embodiment of the present disclosure, the components 202-216 may be in the form of hardware components, while in another embodiment, the components 202-216 may be in the form of software entities/modules. In yet another embodiment of the present disclosure, the components may be a combination of hardware and software modules. For example, each software module may be a computer executable code created using a structured programming language such as C, an object oriented programming language such as Java, or any other high-level or low-level programming language that may be stored, compiled or interpreted to run on one of a general-purpose computer and/or dedicated computing device, as well as heterogeneous combinations of processors, processor architectures, or combinations of different hardware and software. The components 202-216 are configured to send data or receive data to/from each other by means of wired or wireless connections. In an embodiment of the disclosure, one or more of the units 202-216 may be remotely located.

The present disclosure discloses a distributed database management system where data is stored over multiple nodes in such a way that, along with data, time value is also stored each time when a key is mapped to data or value. The new proposed data model stores data in two tables—one where data is stored and second where key values are stored at a specific time.

Deduplication

The present disclosure also discloses the feature of deduplicating where data is deduplicated based on exact matching of block content. In some embodiments, the present disclosure may implement, in addition to the space saving gained by deduplication, compression techniques on individual data values. Compressing the small chunks of data may be helpful, but as the benefits of implementing compression generally only become apparent with much larger data files (that have repetitive content), the compression may be applied selectively.

Timestamp

The present disclosure uses a hybrid time algorithm to resolve timings between events. A hybrid time is based on system clock time with additional data to ensure timestamps are unique. Here, the present disclosure provides nanosecond accuracy of the conventional system clock. The present disclosure logical time is made up of the clock combined with a node ID encoded into the lowest bits as well as a sequence number optionally included in other (low order) bits. This enables a highly distributed set of computers to allocate globally unique timestamps without having to access any centrally controlled counter or "ticket server", which would be a serious performance limitation (i.e. bottleneck) on overall system speed were it required.

RAFT Configuration Nodes

The present disclosure implements a distributed set of 3 node RAFT groups to spread the load and responsibility of distributed agreement among available nodes. In such a scenario, there are 1024 3-node RAFT groups each responsible for agreeing the updates to $\frac{1}{1024}$th of the key hash space. Further, there are rarely 1024 nodes available in the system so each server node such as 104a runs several RAFT processes in parallel. A single node such as a node 104a includes a separate RAFT member for most groups running on it. In the simplest case with only 3 real-time nodes 104a, 104b and 104c, each node 104 runs 1024 RAFT instances each. The distributed RAFT system allows for high volume single key transactions. When multi-key transactions are implemented, the present disclosure uses PAXOS groups with a dynamic movement of agreement groups (using a super-configuration PAXOS group) to manage load.

PAXOS Configuration Nodes

To provide defined key subspaces that support atomic multi-key operations, the present disclosure implements a distributed global consensus POXOS algorithm.

Suppose that there are 3 groups of 3 PAXOS groups (9 nodes in total, not shown in FIG. 2), and that the system is configured to use each of these groups in a "Round-Robin" manner. If one of these groups suffers 2 failed nodes, then only this one group will be unable to achieve agreements. At the specified trigger the system moves to one of the other groups where it is then able to proceed, so that the system is only blocked for a short period of time.

In the simplest of such schemes, the agreement groups are used in a constant cycle for a fixed time—for example 1 second each. The system is then unable to write updates for 1 second out of every 3. This is a 30% drop in performance but the system still makes some progress with up to 4 nodes out of 9 having failed.

This scheme is however vulnerable to inconsistencies in the face of serious network partitions, where clients can "see" nodes but the nodes themselves cannot see all of the rest of the nodes. In this case a "split-brain" may occur with nodes on each side of the partition agreeing blocks of edits without the other side being fully aware of them.

A more sophisticated scheme is to allocate a group of 3 nodes with a lease that can be handed onto another group in the case of a single failure. With 3 nodes in a group, the remaining 2 can quickly agree to stop handling updates and send all current updates together with a transfer request to the next group. Thus activated the new group can take over the agreement role. In this way the system can tolerate 7 failures out of 9 as long as failures cascade rather than being coincident. To tolerate 2 coincident failures the fundamental groups would have to be groups of 5-node PAXOS groups.

Another alternative is to have a "configuration group" that is a large super-tolerant PAXOS group, perhaps with over 9 nodes and thus tolerant to 4 coincident failures. This group's role is to agree which groups of 3 nodes form the current agreement group and for what key ranges. It is then possible to split agreement responsibilities for different key ranges but then alter these ranges dynamically in response to load and atomic transaction requirements. For example if a transaction needs to atomically alter keys from 2 or more key ranges the configuration group could be used to agree a range change that puts all the required keys into a single range—perhaps only temporarily in order to achieve the transaction.

In this way key ranges can be controlled dynamically to spread load (into multiple smaller PAXOS groups) but also provide global transactions on arbitrary sets of keys. As long as a 3 node PAXOS group can react to one failure within it and advise the configuration group of this state, the configuration group can reallocate responsibility and thus achieve scalability with very high tolerance to failures.

ACID Support

ACID update property stems from a high-performance implementation of distributed agreement. The nature of distributed agreement is to provide atomicity (all or nothing) updates that guarantees either a majority of nodes agree on an update, in which case it is applied, or no majority can be constructed in which case the update is rejected. A high-performance implementation of distributed agreement also gives a fundamental guarantee of consistency—i.e. each client will receive a consistent view of the data at all times. Further, the distributed agreement ensures all nodes in a distributed system will agree on what is committed, and therefore what final state to arrive at even in the event of concurrent execution of transactions. Additionally, the distributed agreement allows a configurable number of failures to occur without making the system unavailable for writes/updates.

Exemplary Data Model Schema

FIG. 3 shows exemplary tables 300, e.g., a string (key) table 302 and a data table 304, collectively indicate data model schema. The string table 302 includes string 302a (indicates a key to refer to data), time 302b (indicates the time when a key is mapped or assigned), and data reference 302c (indicates an address or a pointer to the data). The column 302a outlines keys such as "key1" marked as 310, and "key2" marked as 312. The column 302b further outlines time marked as 320, and 322. The column 302c further outlines data references marked as 330, and 332. The data table 304 includes columns such as data reference 304a, and data value (bytes) 304b. The column 304b includes data bytes marked as 340 and 342.

Method Flowchart

Figure 4:
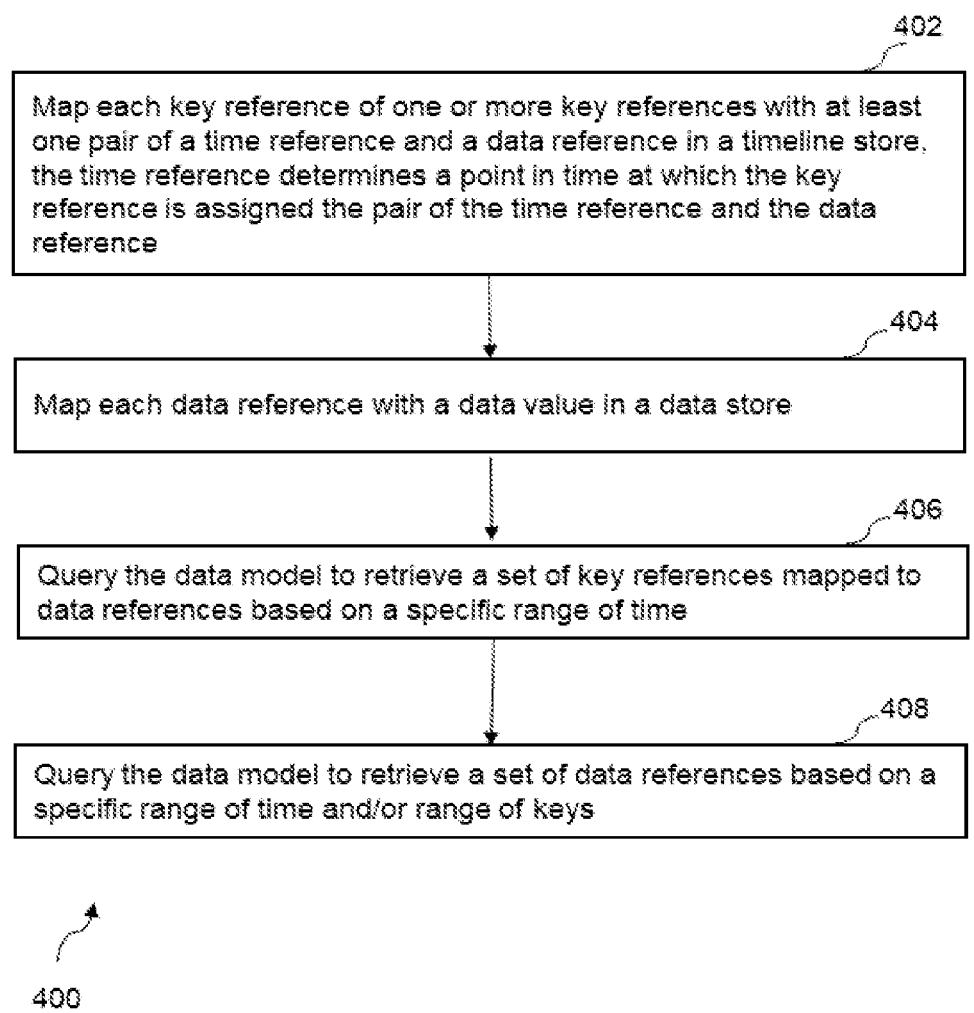
FIG. 4 is a method flowchart for managing data in a database in accordance with a data model, according to an example embodiment of the present disclosure.

FIG. 4 is a method flowchart 400 for managing data in a database in accordance with a data model. The method is discussed with respect to creation as well as management or handling of the database i.e., retrieval of data, executing transactions such as insert, delete, update, add or the like. Some steps may be discussed with respect to creation of database entries in accordance with a temporal data model. While some steps may be discussed with respect to retrieval of the data as shown in FIG. 1.

The method begins with when a user (client) wishes to store certain data in a database. In context of the present disclosure, the data is stored in the database along with time entries and is stored in an ordered list of pairs (e.g., data reference, time). For easy retrieval and efficient processing (in that nodes can store all updated references in RAM and therefore scan the in-memory data structures at high speed), the data storing part is split into two parts: (1) storing data value (e.g., under a data reference), and (2) storing key→data reference pair at a specific time interval. At the time of storing, each data reference of one or more data references with a data value of a block of data in a data store is mapped, at step 402. In turn, at step 404, each key reference of one or more key references is mapped with at least one pair of a time reference and a data reference in a timeline store. The time reference determines a point in time at which the key reference is assigned the pair of the time reference and the data reference. Timestamps made in the system are generated by a distributed algorithm that guarantees globally unique timestamp values (without the need to refer to a central master server which would otherwise create a performance bottleneck), and therefore there is a system-wide concept of ordering of operations that scales out to large number of independent "nodes" in such a way that all nodes will consistently agree as to the order of operations applied (and therefore the value of any data reference at any time). In this manner, the data is stored in the database in accordance with the data model (e.g., a temporal data model). Because of the space efficient nature of this division of storage processes, the timeline store can be loaded in a main memory (e.g., RAM) for fast query processing.

Retrieval is executed when a user wishes to view certain data or apart of data, and writes a query to retrieve the data. It should be understood that retrieval includes query processing. At step 406, the data model is queried to retrieve a set of key references mapped to data references based on a specific range of time. In some embodiments, the data model is queried to retrieve a set of key references mapped to data references based on a specific range of keys. In some embodiments, the data model is queried to retrieve a set of key references mapped to data references based on a specific combined range of time and keys, including the option where one or both ranges are unlimited at either or both of their respective start or end values. At step 408, the data model is queried to retrieve a set of data references based on a specific range of time. In some embodiments, the data model is queried to retrieve a set of data references based on a specific range of keys. In some embodiments, the data model is queried to retrieve a set of data references mapped to data references based on a specific combined range of time and keys. One illustrative example of a key time range is "All Keys and their values between '/user/Andrews' and '/user/Barton' at times between '10/01/2005 10:59:04' and '10/02/2005 11:29:00'". Allowing for unlimited bounds one can also express "All Keys/values between '10/01/2005 10:59:04' and '10/02/2005 11:29:00'", "All keys/values between '/user/Andrews' and '/user/Barton' after '10/01/2005 10:59:04'", and "All keys between '10/01/2005 10:59:04' and '10/02/2005 11:29:00'".

The method illustrated in FIG. 4 also includes updates to one or more key references simultaneously (e.g., a transaction). When each key reference is updated, the key reference in the timeline store is mapped to a new pair of a time reference and a data reference. The illustrated method also includes conditional updates to the key references. Here, updates to the key references are managed based on a pre-defined condition specified within a transaction request. The pre-defined condition is, for example, to check if an update to the key-time ranges specified has occurred in the time since the transaction was created but before it could be applied to the database store. For example, if there is an edit/update within the key-time range specified in the transaction creation, then an update to the key references will not occur (the transaction will be failed and requesting client notified of this fact). This pre-condition range is specified using (key, time) ranges. This fixed size condition allows a transaction to contain millions of updates, which may take some time to prepare in the server memory, and not "block" other operations on the database (e.g., reads or writes) in the meantime.

Updates to the key reference can be performed or managed using a distributed and fault-tolerant agreement algorithm. In one example, the distributed and fault-tolerant agreement algorithm is implemented using a distributed set of RAFT groups, wherein each of the RAFT groups runs on one or more nodes. In some example embodiments, the distributed and fault-tolerant agreement algorithm is implemented using a distributed set of PAXOS groups, wherein each of the PAXOS groups runs on one or more nodes.

The method further includes deduplicating data in the data store. The data is deduplicated based on exact matching of content of the block of data.

Use Cases & Implementation Examples

The present disclosure discloses methods and systems for managing data in a database in accordance with a data model. Specifically, the present disclosure facilitates a transactional system that records every edit (or a maximum number of edits), has unlimited storage in practice, and offers scale and high performance data querying abilities on a data model. The methods and systems described herein provide a number of advantageous features such as: (1) offering a familiar platform (e.g., NoSQL Key-Value store, with added timelines/histories) to build applications (including the option of layering on top other models such as the common "Relational" model that can support a full SQL storage and querying abilities); (2) providing a platform where consistency and atomicity are supported; (3) enabling rollback to any state (including specific times where the whole system's data is known to be at a stable/good state) and is therefore immune from data loss; (4) providing or functioning as an inherent backup, thereby removing the need to build and manage another set of backup technologies and processes; (5) enabling recovery of all data at all the times, thus satisfying onerous data retention regulations automatically; and (6) scaling horizontally to accommodate the big-data age. The present disclosure focuses on applying transactions in a distributed environment and getting ACID properties. The present disclosure uses database management system that provides high availability, while maintaining data and transaction consistency, integrity, durability and fault tolerance.

Resilience implies some levels of immunity to data loss when systems fail (temporary or permanently), and most technologies are focussed on maintaining a "current" version of the data state under such failures. Backups mitigate disasters by offering the option of reloading a system from a previous state, but these are less than ideal as there is always the most recent data that is lost nevertheless. The timeline store model offers a solution to both of these issues, where the continuous recording of data mutations implies the ability to read the data store at any time in the past, while the resilient distributed agreement (PAXOS) implies immunity to failures to a level selectable by the Solution Architect. The timeline store model merges and unifies data storage models used throughout the business world in a way that offers significant improvements and lower complexity compared to current solutions when assessed for operational resilience (e.g., fault-tolerance) and data consistency. With every edit/update to data recorded (efficiently using deduplication) any data can be recovered from a past state and thus there is no need to make backups. Because timeline store contains multiple copies of all data across a configurable number of independent storage nodes (typically 3), hardware failures are mitigated as any data can be retrieved from any of the stored copies (from different storage devices).

Deduplication mechanism, built directly into the timeline storage model as well as being implemented with a highly distributed fault-tolerant algorithm, means that the data storage space explosion that would otherwise result from the policy of storing all data changes over all time does not occur. The deduplication makes its data model a credible proposition for modern business practice at a time when the security of data, its value to business continuation and the increasing burden of auditability required by various industry regulatory bodies are all complex requirements that are becoming more difficult and costly to meet with older technologies.

The concept of storing data in "timelines" is a fundamental shift away from many current database system assumptions, but a move that is timely in the current global business context. Not for several decades have there been changes to the business environment that require such fundamental adjustments that couldn't be absorbed into a standard RDBMs product such as Oracle, MySQL or SQLServer. The age of "Big Data", that requires horizontally scalable systems with techniques that can't be addressed with single server technologies, has quickly been followed by regulatory changes and consumer expectations that imply such detailed data archiving that recording every edit over time is a consequential requirement. A resilient, scalable and durable "timeline" store is the natural extension that satisfies all these recent business needs but also provides systems architects and developers with a simple and manageable data model on which to build their applications.

Resilient Store of Data Block Implementation:

(1) Compute the content-based hash H of the data D. H is a fixed length (in the current implementation between 16 and 48 bits depending on the choices before the Solutions Architect), while D has variable length (maximum length chosen at installation time by the Solutions Architect). (2) Using the PERMUTE function, generate a list of node IDs onto which this data block should be stored. (3) Given the duplication requirement (e.g., 10 independent copies), copy this data onto the first 10 nodes that are known to be available at the time, thus allowing for nodes/servers to be unavailable at any time. (4) If one or more of these storage attempts fails, mark the failed node as unavailable and store onto the next one in the PERMUTE sequence. (5) Confirm storage to the user only when sufficient stores have succeeded. If the client process crashes then it can restart and retry the process, which will naturally continue where the previous (crashed) client stopped as the hash H of the data D will be computed identically each time (the hash is based only on the content of the data D). (6) Steps 4-5 can continue multiple times until the required number of copies that have been stored as required by the client. (7) As nodes are removed or added from the system the consistency of the PERMUTE function (which is fixed at design/install time) means that any node in the system can independently determine which blocks of data belong on each node, and can send blocks around the system until all levels of data duplication have been satisfied. (8) In particular, adding more nodes results in data blocks being moved around to level out the used storage on each node automatically. Every node can run such "auto-leveling" jobs in the background as the locations of each data block can be computed consistently on each node as required without reference to any central authority. Hence the system is inherently distributed and fault-tolerant with no single point of failure. (9) When all these steps are complete, the storage system can supply the client with a fixed size receipt R that uniquely identifies the stored data D. A client (or other node in the system) can ask any storage node for the data and this request can be uniquely forwarded to one of the nodes that have a copy of D. Similarly, a client that co-incidentally stores a block that happens to be the same as D will receive the same storage receipt R from one of the storage nodes that had previously stored D. This distributed deduplication property of the system ensures data is stored efficiently with no more copies than absolutely required.

Resilient/Consistent Store of Timeline Implementation:

(1) Store data D as per example above with the required number of duplications. Retrieve the storage receipt R (in the current implementation a 64 bit number) and submit this to the timeline store that is configured to record the time at which a (String) key is assigned to that data value D (even though only the receipt R for D is stored in the timeline store). (2) The timeline store consists of a distributed consensus group of nodes that can agree on assignments in a fault-tolerant way (e.g., PAXOS). For speed, these systems normally agree on assignments using RAM rather than committing directly to disk each time. For increased resiliency the number of nodes in this consensus group can be increased—the minimum is 3 but can usefully be 5 or even 7. (3) The long-term log of the consensus process can be stored locally on each node, inherently resilient as they are guaranteed to be exact copies of the logs on all the other members of the consensus group. Alternatively, the logs can be broken up into segments and stored as a raw block using a block-store system (with distributed nodes and consistent hashes) as per the description above.

Key-Time Range Search of Timeline Store Implementation:

The timeline logs on each consensus node (described above) represent a time-ordered stream of data edits to all keys. A query can be satisfied by scanning these logs, much of which can be held in fast-access RAM due to their space-efficient representation. To speed up this basic search it is possible to index the "flat" edit log to group keys together so that queries can be satisfied by scanning smaller subsets (in RAM or retrieved from disk). Similarly, these logs can be broken up into time ranges so again a query scan can limit the data searched to only those blocks that are relevant to the query search parameters.

The present disclosure may be implemented in the form of a computer programmable product for managing data in a database in accordance with a data model. The computer programmable product includes a set of instructions, the set of instructions when executed by a processor causes the processor to perform the methods as discussed with reference to FIG. 4.

The present disclosure may be implemented for any environment having multiple server nodes. Various environments are discussed in FIG. 1 but the disclosure may be implemented for other environments although not mentioned.

The present disclosure may be implemented in a regular client-server configuration, however other configurations may also be implemented.

The method flowcharts or processes described above, and steps thereof, may be realized/executed in hardware, software, or any combination of these suitable for a particular application. The hardware may include a general-purpose computer and/or dedicated computing device. The processes may be realized in one or more microprocessors, microcontrollers, embedded microcontrollers, state machine, programmable digital signal processors or other programmable device, along with internal and/or external memory. The processes may also, or instead, be embodied in a general purpose processor, a digital signal processor (DSP), an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++/Java, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Computer storage media includes volatile and nonvolatile, removable and non-removable media implemented in any method or technology for storage of information such as computer-readable instructions, data structures, program modules, or other data. Computer storage media can include memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid state devices (e.g., solid state drive (SSD), flash memory drive (e.g., card, stick, key drive)), or any other like medium which can be used to store the desired information and which can be accessed by the computer.

The database management system as described in the present disclosure or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the method of the present disclosure.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include one or more commands that instruct the processing machine to perform specific tasks that constitute the method of the present disclosure. The set of instructions may be in the form of a software program. Further, the software may be in the form of a collection of separate programs, a program module with a larger program or a portion of a program module, as in the present disclosure. The software may also include modular programming in the form of object-oriented programming. The processing of input data by the processing machine may be in response to user commands, results of previous processing or a request made by another processing machine.

For a person skilled in the art, it is understood that these are exemplary case scenarios and exemplary snapshots discussed for understanding purposes, however, many variations to these can be implemented in order to detect objects (primarily human bodies) in video/image frames.

In the drawings and specification, there have been disclosed exemplary embodiments of the present disclosure. Although specific terms are employed, they are used in a generic and descriptive sense only and not for purposes of limitation, the scope of the present disclosure being defined by the following claims. Those skilled in the art will recognize that the present disclosure admits of a number of modifications, within the spirit and scope of the inventive concepts, and that it may be applied in numerous applications, only some of which have been described herein. It is intended by the following claims to claim all such modifications and variations which fall within the true scope of the present disclosure.

What is claimed is:

1. A method for managing data in a database in accordance with a temporal data model, the method comprising:
    mapping each data reference of one or more data references with a data value of a block of data in a data store, using a data update module;
    mapping each key reference of one or more key references with at least one pair of a time reference and the data reference in a timeline store, using the data update module, wherein the time reference determines a point in time at which the key reference is assigned the pair of the time reference and the data reference, and wherein the key reference is a time specific pointer identifying a particular data reference at a particular time;

modelling the timeline store as a plurality of data triplets, each data triplet including one key reference, one time reference, and one data reference;

querying the data model to retrieve a set of key references mapped to data references based on a specific range of time, using a query processor;

querying the data model to retrieve a set of data references based on a specific range of time, using the query processor; and mapping the key reference in the timeline store to a new pair of a time reference and a data reference when the key reference is updated, wherein updates to the key reference are managed using a distributed and fault-tolerant agreement algorithm implemented using a distributed set of RAFT or PAXOS groups, wherein each of the RAFT or PAXOS groups runs on one or more nodes.

2. The method for managing data of claim 1, further comprising querying the data model to retrieve a set of key references mapped to data references based on a specific range of keys.

3. The method for managing data of claim 1, further comprising querying the data model to retrieve a set of data references based on a specific range of keys.

4. The method for managing data of claim 1, further comprising querying the data model to retrieve a set of key references mapped to data references based on a specific combined range of time and keys.

5. The method for managing data of claim 1, further comprising querying the data model to retrieve a set of data references based on a specific combined range of time and keys.

6. The method for managing data of claim 1, further comprising loading the timeline store in a main memory for query processing.

7. The method for managing data of claim 1, wherein updates to the key reference are managed based on a pre-defined condition.

8. The method for managing data of claim 7, wherein the pre-defined condition is to check if the update is within the key-time range specified in a transaction request.

9. The method for managing data of claim 1, further comprising deduplicating data in the data store.

10. The method for managing data of claim 9 further comprising deduplicating data in the data store based on exact matching of content of the block of data.

11. A database management system for managing data in accordance with a temporal data model, the database management system comprising:

a timeline store configured to store one or more key references, wherein each key reference of the one or more key references is mapped to at least one pair of a time reference and a data reference, and wherein the time reference determines a point in time at which the key reference is assigned the pair of the time reference and the data reference, and wherein the key reference is a time specific pointer identifying a particular data reference at a particular time, and the timeline store is modelled as a plurality of data triplets, each data triplet including one key reference, one time reference, and one data reference;

a data store configured to store one or more data references, wherein each data reference is mapped to a data value;

a query processor configured to:
  query the data model to retrieve a set of key references mapped to data references based on a specific range of time; and
  query the data model to retrieve a set of data references based on a specific range or ranges of time; and a data update module configured to map the key reference in the timeline store to a new pair of a time reference and a data reference when the key reference is updated, wherein updates to the key reference are managed using a distributed and fault-tolerant agreement algorithm implemented using a distributed set of RAFT or PAXOS groups, wherein each of the RAFT or PAXOS groups runs on one or more nodes.

12. The database management system of claim 11, wherein the query processor is further configured to query the data model based on at least one of a range of key references and a range of time references.

13. The database management system of claim 11, further comprising a data deduplication module configured to deduplicate data in the data store.

14. The database management system of claim 11, further comprising a time management module configured to use a hybrid time for event time resolution, wherein the hybrid time is based on system clock time and an additional data set.

15. The database management system of claim 11, further comprising a transaction processing module configured to implement a distributed set of consensus processing groups, wherein each of the consensus processing groups runs on one or more nodes.

* * * * *